Dec. 27, 1938.                G. H. SELF                2,141,830
         COMBINATION GROUND CRUST BREAKER, WEEDER, AND MULCHER
                         Filed Nov. 23, 1937
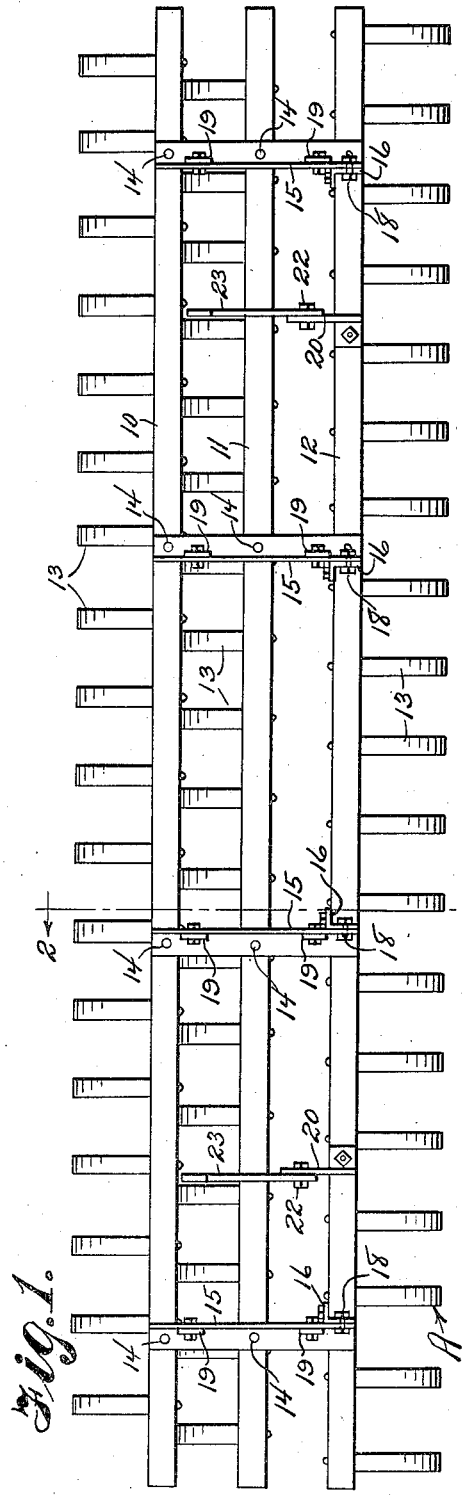
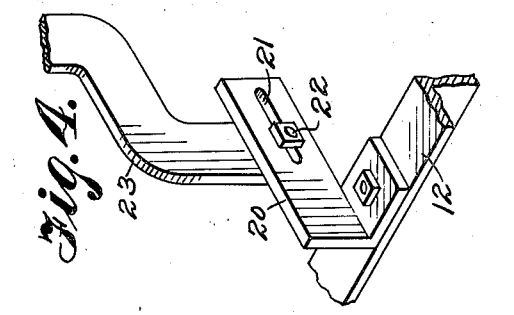
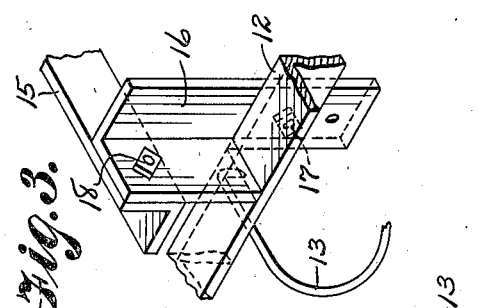
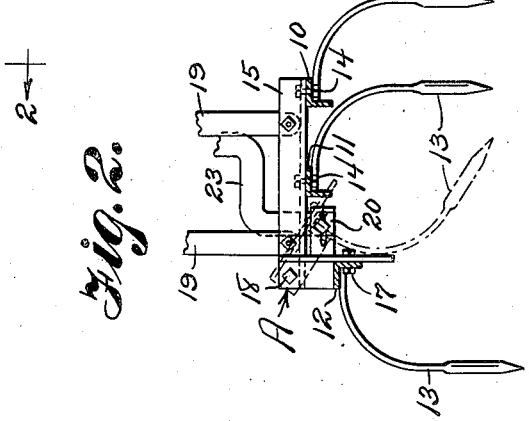
Grafton H. Self
INVENTOR
BY Victor J. Evans & Co.
ATTORNEYS Patented Dec. 27, 1938

2,141,830

UNITED STATES PATENT OFFICE 2,141,830

COMBINATION GROUND CRUST BREAKER, WEEDER, AND MULCHER

Grafton H. Self, Twin Falls, Idaho

Application November 23, 1937, Serial No. 176,140

4 Claims. (Cl. 55—127)

The invention relates to a combined ground crust breaker, weeder and mulcher and more especially to refinements in the subject matter of an application for United States Letters Patent filed May 4, 1937, bearing Serial Number 140,760.

The primary object of the invention is the provision of an implement of this character, wherein the same is susceptible for use as a weeder and mulcher and on inverting a part thereof the said implement will function for breaking the crust formation of soil in a downward direction between the rows of a growing crop and simultaneously effecting weeding and the mulching of the loose soil without liability of damaging the plants, this crust breaking being for the purpose of having moisture seep into the ground for reaching the roots of the plants for the healthy growth thereof.

Another object of the invention is the provision of an implement of this character, wherein the ground crust breaking elements can be readily and easily set in conformity with the requirements in the working thereof, the adjustment or setting being had with dispatch and in the working of such elements there is no liability of the throwing of the broken soil in proximity to the planting or the growing plants and the crust is broken in a downward direction without liability of scattering of the loosened soil, which would result in the breaking of the crust in an upward direction or upwardly from beneath the same.

A further object of the invention is the provision of an implement of this character, wherein the construction thereof is such that it is susceptible of use as a weeder and mulcher and in combination through the easy converting thereof as a crust breaker, this being effected in advance of the weeding and mulching activity or working of the implement.

A still further object of the invention is the provision of an implement of this character, which is simple in its construction, embodying refinements over the subject matter of an application for United States Letters Patent filed May 4, 1937, Serial Number 140,760, thoroughly reliable and efficient in operation, easy of adjustment, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a top plan view of the implement constructed in accordance with the invention and converted for use as a combination ground crust breaker, weeder and mulcher.

Figure 2 is a sectional view on the line 2—2 of Figure 1 looking in the direction of the arrows.

Figure 3 is a fragmentary perspective view showing in detail the conversion of the implement in the setting of a part thereof for crust breaking operation.

Figure 4 is a fragmentary perspective view showing in detail one of the hangers employed in the implement when a part thereof has been converted for crust breaking operation.

Similar reference characters indicate corresponding parts throughout the several views in the drawing.

Referring to the drawing in detail, A designates generally the weeder and mulcher, which in its set-up as disclosed in the application for United States Letters Patent filed May 4, 1937, serially numbered 140,760, includes the spaced parallel transversely disposed tooth or tine carrying bars 10, 11 and 12, respectively, each being of inverted substantially L-form and suspend therefrom the longitudinally directed cultivating teeth or tines 13, which are spaced in rows from each other as is customary in harrows or cultivators for ground working purposes and especially in the cultivation of growing plants. The disposition as to the spacing of the teeth or tines 13 can be regulated in conformity with the requirements incident to the working of the soil. The bars 10, 11 and 12 making up the frame for the teeth or tines 13 are bolted or otherwise fastened in spaced parallel relation at 14 to substantially L-shaped cross struts or tie members 15 which are spaced from each other at determined distances apart and when the implement is employed for weeding and mulching operations, the teeth or tines 13 in the respective rows are directed rearwardly and downwardly for ground working purposes.

The present invention contemplates the separation of the foremost bar 12 with the row of teeth or tines 13 a part thereof, the fasteners 14 being of a kind for such separation and on separation this particular bar is reversed so that the teeth or tines 13 a part thereof will be disposed forwardly and downwardly in a reverse position to the tines or teeth 13 on the other bars 10 and 11 of the frame. This foremost bar 12 of the frame has thereon at determined intervals hanger brackets 16 bolted or otherwise detachably fastened at 17 to the said bar. This fastening 17 allows for adjustment of the bar and brackets relative to each other, the said brackets being also pivotally connected at 18 to the tie members 15 so that the said bar is susceptible of vertical swing and in this manner allowing for a change of the position in reverse of the teeth or tines 13 on said bar. The reversed position of these teeth or tines 13 effects a downward breaking action upon the crust formation at the ground level or surface so that this particular group of teeth or tines function for ground crust breaking in advance of the weeding and mulching activity of the remaining teeth or tines 13 in rear thereof and carried by the bars 10 and 11.

The tie members 15 as usual are bolted or otherwise fastened to hangers or carrying stems 19, which are clamped or otherwise made fast to a cultivator frame (not shown) for the hitch of the implement therewith.

This foremost bar 12 has at several points thereof, preferably intermediate with respect to the tie members 15, arms 20, each having the slot 21 therein receiving a pivot bolt 22 carried by an adjusting hanger or member 23 which is also clamped to the frame of the cultivator and is susceptible of adjustment to change the disposition of the forwardly and downwardly directed teeth 13 on the bar 12, one position thereof being indicated by full lines in Figure 2 and another position by dotted lines in said figure of the drawing.

The implement as set forth herein is a refinement over the subject matter of the application for United States Letters Patent filed May 4, 1937, Serial Number 140,760, and by its construction can be converted for use as a weeder and mulcher or the combination ground crust breaker, weeder and mulcher.

The disposition of the teeth 13 on the bar 12 with relation to the teeth 13 on the bars 10 and 11 enables these teeth 13 on the bar 12 to exert a downward pressure upon the top of the soil and thus effect a breaking of crust formation thereof in a downward direction while the teeth 13 on the bars 10 and 11 being rearmost of the implement follow the crust breaking activity for weeding and mulching of the soil.

What is claimed is:

1. In an implement of the kind described having a plurality of rows of teeth normally directed rearwardly and downwardly, a support for the said teeth, and means included with said support and at the foremost teeth for changeability of the disposition of these teeth forwardly and downwardly from normal position thereof.

2. An implement of the kind described having a plurality of rows of rearwardly and downwardly directed teeth, comprising a support for certain of said teeth, and means for changeably fastening the said support in the implement for the changing of the foremost teeth thereon from a rearwardly and downwardly directed disposition to a forwardly and downwardly directed position.

3. In an implement of the character described, a support, a plurality of rows of rearwardly and downwardly directed teeth on said support, and a lead row of forwardly and downwardly directed teeth on said support.

4. In an implement of the character described, a support, a plurality of rows of rearwardly and downwardly directed teeth on said support, a forward row of forwardly and downwardly directed teeth on said support, and means for altering the disposition of the last-named row of teeth in said implement.

GRAFTON H. SELF.